(12) United States Patent
Chuang et al.

(10) Patent No.: US 6,654,655 B1
(45) Date of Patent: Nov. 25, 2003

(54) TARGET GENERATION SYSTEM BASED ON UNLIMITED CAPACITY ALLOCATION

(75) Inventors: Kuo-Fong Chuang, Ching-Li (TW); Kuo-Chen Lin, Tainan (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 455 days.

(21) Appl. No.: 09/636,562

(22) Filed: Aug. 10, 2000

(51) Int. Cl.$^7$ .................................................. G06F 19/00
(52) U.S. Cl. ........................................... 700/100; 705/8
(58) Field of Search ........................... 700/99–104, 106, 700/213, 216, 97; 705/8, 9

(56) References Cited

U.S. PATENT DOCUMENTS

| | | | | |
|---|---|---|---|---|
| 5,311,423 A | * | 5/1994 | Clark | 705/8 |
| 5,546,326 A | * | 8/1996 | Tai et al. | 702/84 |
| 5,818,716 A | * | 10/1998 | Chin et al. | 700/100 |
| 5,826,238 A | * | 10/1998 | Chen et al. | 705/8 |
| 5,872,918 A | | 2/1999 | Malomsoky et al. | 709/220 |
| 5,880,960 A | * | 3/1999 | Lin et al. | 700/99 |
| 5,913,200 A | | 6/1999 | Wakiyama | 705/8 |
| 6,006,199 A | * | 12/1999 | Berlin et al. | 705/26 |
| 6,198,980 B1 | * | 3/2001 | Costanza | 700/99 |
| 6,243,612 B1 | * | 6/2001 | Rippenhagen et al. | 700/100 |
| 6,303,395 B1 | * | 10/2001 | Nulman | 438/14 |

* cited by examiner

Primary Examiner—Leo Picard
Assistant Examiner—Paul Rodriguez
(74) Attorney, Agent, or Firm—Tung & Associates

(57) ABSTRACT

A method and system for production line target generation based on unlimited capacity allocation utilizing an algorithm that begins with setting the required delivery date (REQ_DATE) from the customer's purchase order and using the REQ_DATE to define other related requirements by backtracking the production line requirements to determine how many stages need to be passed before delivery, and to decide where and how to setup and arrange the production equipment, in order to complete and deliver the ordered goods on time. Particularly, the processing of each lot is monitored while passing through the processing stages by: calculating the days remaining, $D_R$, by subtracting the present date from the initial delivery date, REQ_DATE−TODAY, for each lot; calculating the processing stages remaining for each lot to reach the last processing stage, to determine the remaining stages, $S_g$=last processing stage's number—the instant stage number; and dividing the remaining stages by the remaining days, $S_g/D_R$, to derive the penetration stages per day required for each lot; and then, using the derived penetration stages to target for the movement of the lots through each remaining stage to achieve the production goal in a timely manner.

4 Claims, 1 Drawing Sheet

TARGET GENERATION SYSTEM BASED ON UNLIMITED CAPACITY ALLOCATION

BACKGROUND OF THE INVENTION

1. Field of the Invention

The present invention relates generally to a system and method for planning the product flow in a manufacturing process to ultimately achieve a production goal in a timely manner, and particularly to a target generation system for a processing line that uses the required delivery date of a production order to define related requirements to allocate capacity and move production lots through the manufacturing stages to efficiently deliver the production order on time.

2. Prior Art

In processing lines for performing operations on work pieces, such as those for semiconductor fabrication, there are various processing stages through which a number of product lots must be passed to achieve a production goal. Achieving a production goal in a given time to fulfill a product order requires the setting of targets through the processing to the end of the line. There are many types of target generation systems for production orders derived by simulation tools or by experience gained from process operations. Two examples of such prior art systems are found in U.S. Pat. Nos. 5,872,918 and 5,913,200.

Typically most of the known systems count on current work-in-progress, WIP, distribution and depend purely on "push-out" activities. As a result, the meeting of production deadlines and the efficiency of the processing is often problematical.

Problem to be Solved

It is therefore a problem in the art to achieve a reliable and efficient target generation system for production orders that require the processing of product lots in a sequence of different process stages.

Objects

It is accordingly an object of the present invention to provide a target generation system for reliably and efficiently managing the passing of product lots through a processing line to achieve delivery of a desired product order by a deadline date.

It is another object of the invention to provide a system and method for production line target generation, wherein a number of lots of workpieces are passed through a series of fabrication stages during processing, to ultimately achieve a production goal in a timely manner.

It is also an object of the invention to provide a system and method for target generation in semiconductor wafer fabrication to ensure production of a sufficient number of wafer lots by a preset date to fulfill an order in accordance with a customer's request.

SUMMARY OF THE INVENTION

The present invention involves a method and system for production line target generation based on unlimited capacity allocation and utilizes an algorithm that begins with setting the required delivery date, REQ_DATE, from the purchase order issued by the customer. Based on the REQ_DATE, other related performance factors are defined by backtracking the production line requirements to determine how many stages need to be passed before delivery, and to decide where and how to setup and arrange the production equipment, in order to complete and deliver the ordered goods on time. More particularly, the implementation of the algorithm consists of the following considerations.

The target generation system in accordance with the invention backtracks the production process from the very beginning, which beginning is the purchase order issued by the customer. The purchase order contains the required delivery date, which is the ultimate target, REQ_DATE. From this date, the production line requirements that define how many stages need to be passed by a lot of workpieces or wafers being processed to meet delivery of the order are backtracked and decisions made as to where to setup and arrange the processing equipment to be sure to deliver the specified number of finished goods on time. This contrasts with present target systems, based on linear methods and past experience, wherein, the number of machines required to produce the goods are determined depending on how many goods are needed to meet the goal to deliver the complete goods order on time.

In the backtracking procedure, the target date, REQ_DATE, is first used to determine the days remaining, $D_R$, for carrying out and completing the processing, i.e., REQ_DATE−current date (today). The number of lots of material required to fill the order and the number of processing stages that are needed for each lot to be processed are assessed and the number of stages is divided by the days remaining to estimate generally the number of stages/day that will be required for a lot to be completely processed within the available time. However, as the time taken to complete each stage will differ with the particular processes being performed therein, each stage will have a "theoretical process time", X, i.e., the time taken between when the material of a lot enters the stage and exits the stage. Further, the progress of a lot may be stopped due to manufacturing issues or other conditions, so that some consideration must be given to this situation and time allotted, i.e., "budget time", which has nothing to do with the required date, REQ_DATE. Also, as the "theoretical process time", X, does not include lot delivery time or the time for moving a lot from machine to machine, a time factor, k, is derived for each machine, wherein k−1 (X) is for "budget". K is a performance factor, which may be selected in view of the process being performed by the machine, to accommodate for the "budget time" discrepancy, and typically may be about 3.5 in keeping with the current fabrication process capability in semiconductor wafer processing.

Consequently, in terms of time, the total length of time required to pass through a stage is estimated to be 3.5 X. However, for each stage, the estimated time is not fixed at 3.5 X. Since the progress of the lots through the stages will be monitored and must be adjusted when they fall behind the target, the time estimate for a given stage may be more or less than 3.5 X, depending on how far the given stage is from the last, "wafer out", stage, and adjustment may-be made accordingly. As the number of processing stages needed to fulfill a particular order will be known, the total time for a lot to pass through all the stages may be estimated by summing the estimated times for each of the stages. Having the total time estimated for a lot to be processed and the number of days available, it can be determined whether there is sufficient time for a lot to pass through a stage per day. If not, consideration may be given to increasing the number of machines in each stage to insure that the required number of lots per day are completed by the deadline date, or the number of stages may be divided by the available days to get the number of stages that must be passed or penetrated per day by each lot and the estimated times for the stages may be adjusted.

Also, the number of lots may be summed up for each stage to obtain the number of goods that will pass a certain stage. By summing each lot's penetration of every defined stage, a stage's plan move (target) in one day can be acquired.

If it is known how many stages need to be passed per day for each lot, then all the lots passed by a particular stage can be summed up. Thus it is known for a certain stage, how many goods will pass through on a particular day, and it is also known how many machines need to be allocated to that stage. Accordingly, the system of the invention sets a target for planning moves for each stage.

The output of this system is a summary list:

|  | Move |
| --- | --- |
| Stage 1 | 1000 |
| Stage 2 | 500 |
| Stage 3 | 500 |
| . | . |
| . | . |
| Stage n | . |

BRIEF DESCRIPTION OF THE DRAWINGS

The present invention will be described in more detail below with reference to the accompanying drawing in which.

DETAILED DESCRIPTION OF THE PREFERRED EMBODIMENT

Figure 1:
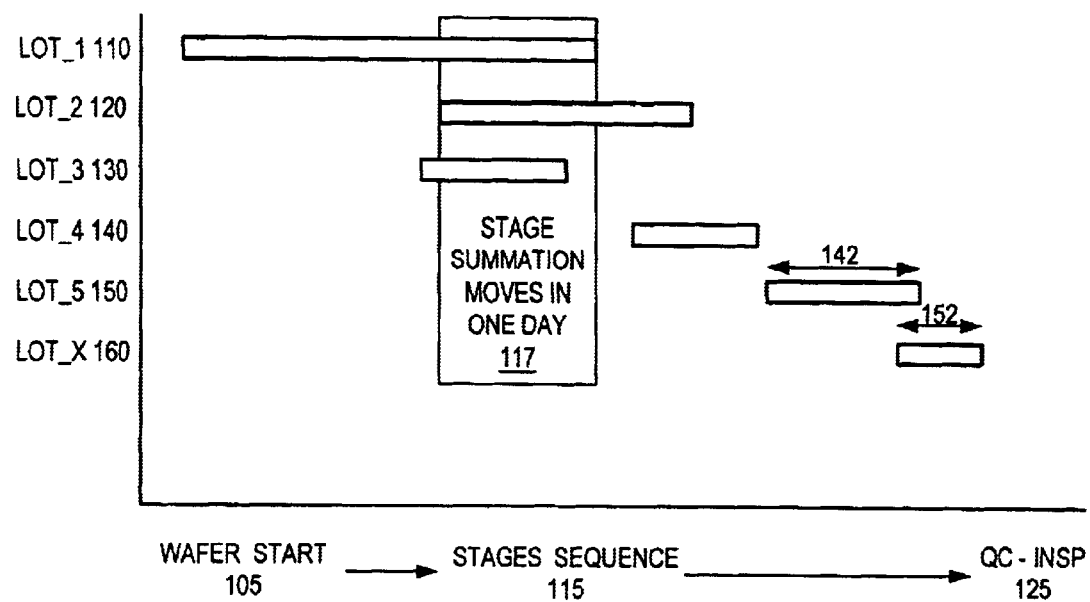
FIG. 1 is a flowchart illustrating the summation, $\Sigma$ lot(i), of each lot's penetrated planned stages within one day to acquire each stage's target moves in accordance with an embodiment of the present invention.

The present invention is directed to a method and system for targeting and achieving a production goal in a manufacturing process, such as semiconductor wafer fabrication, and particularly to a target generation system based on unlimited capacity allocation enabling the determination of dynamic capacity constraints needed to be resolved and utilizing an algorithm using a "pull concept", rather than a "push out" approach, by demanding what is committed to the customer in the product order. Target generation begins with defining the required delivery date, REQ_DATE, from the purchase order issued by the customer. Based on the REQ_DATE and the days available or remaining until that date, other related processing factors are defined by backtracking the manufacturing line requirements to determine how many process stages need to be passed before delivery and to decide where to setup and arrange the production equipment that will provide the executable penetrative stages of each lot in order to complete and deliver the ordered goods on time. The steps of an implementing algorithm for target generation in accordance with the invention involve the following considerations.

Based upon the date agreed upon with the customer for delivery of an order, such as for a number of lots of semiconductor wafers, an initial "delivery date", REQ_DATE, which is the goal for "wafer out", is established. This enables the bypass of the Master Production Schedule (MPS) time lag in every month's beginning and the management of all the lots in the line.

The total time available for completing the fabrication of each lot by the established delivery date can be determined by calculating for each lot the "Remaining Days", $D_R$, using: $D_R$=REQ_DATE−TODAY.

As shown in FIG. 1, each lot such as lot_1 110, lot_2 120, lot_3 130, lot_4 140, lot_5 150 or lot_X 160 during fabrication must pass through a number of processing stages in a stages sequence 115, beginning with the "wafer start" stage 105 as stage 1 and ending with the last stage, which is "quality control inspection", QC-INSP 125, at "wafer out". The number of "Remaining Stages", $S_g$, may be estimated at any given stage using:

$S_g$=the number of the QC-INSP stage−the number of the given stage.

Dividing the estimated "Remaining Stages" by the "Remaining Days", $S_g/D_R$, derives the number of stages that must be passed per day, i.e., "penetration stages per day", P-stages/day, by a lot in order to complete its processing by the target deadline. Therefore, a lot must pass through an average of $S_g/D_R$ stages per day if the target delivery date, REQ_DATE, is to be met for that lot.

As different stages require different time periods for completion, depending upon the type of processing to be carried out by each stage, the number of stages that can be carried out in a day will normally vary. The time taken for a lot to pass through a given stage, i.e., the time from when the material of a lot being processed enters a stage to the time it exits that stage, may be designated as X and called "theoretical processing time". While this time X is measurable as typical for the performance of the particular equipment to be used to carry out the processing at that stage, still practically the actual time may be somewhat different to take into account additional "Budget Time" as will be explained below.

Three fabrication process conditions relating the "theoretical processing time", X, to "Remaining Days", $D_R$, are:

a) $D_R$<CT (1X);

b) CT (1X)<$D_R$<CT (KX); and c) $D_R$>CT (KX);

where,

CT=cycle time; and

K=a performance factor, which may be selected in view of the process being performed, to accommodate for the above-noted "theoretical" time discrepancy, and typically may be about 3.5 as used for current fabrication process capability in semiconductor wafer processing.

In view of these conditions, the following relationships may be established with respect to the processing of a production lot:

a) If a lot is delinquent or the remaining days $D_R$ are less than theoretical process time 1X, then the lot is defined as having a "theoretical process time" equal to the remaining days (1X=$D_R$) to establish the "penetration stages per day", P-stages/day, needed for that lot;

b) If a lot's remaining days $D_R$ are within 3.5 x "theoretical process time" (3.5X) and greater than 1X, then the remaining days minus 1X, ($D_R$−1X), is used to establish a "remaining allowable queuing time", Budget_q, for that lot; and c) If a lot's remaining days $D_R$ are more than 3.5X, then the Budget_q is set at 2.5X (manipulative).

The "remaining allowable queuing time", Budget_q, is related to the specific stages as follows:

Budget_q/Remaining Stages=Stage Budget_q=($D_R$−1X)/$S_g$);

Stage Budget_q=0 when the condition of a) is met;

Stage Budget_q=(0 <Number<2.5X)/Remaining Stages, when the conditions of b) are met; and Stage Budget_q=2.5X/Remaining Stages, when the condition of c) is met.

Also,

Stage Budget_q+1X, i.e, ("remaining allowable queuing time"/Remaining Stages)+"theoretical process time"="stage estimated cycle time", SeCT.

There are some possible situations, especially at diffusion stages with long process times in wafer processing, when the "stage estimated cycle time" (SeCT) will be greater than 24 hours so that there will be no "penetration stages/day" available, and thus it is necessary to use a "stage modified cycle time" (SmCT) to avoid this kind of problem situation, to wit, Stage modified cycle time SmCT=Minimum SeCT (minimum "stage estimated cycle time" being 24 hours).

The executable "penetration stages" of each lot will be, to P-stages=24 hrs/Σ SmCT (downward cumulated stages from the present stage with cumulated modified cycle time approximated to 24 hours in a working day). If a lot's cumulated stages (or final stage) estimated cycle time, SeCT, is over 24 hrs, that means the lot will become the WIP of the final stage without any moves.

FIG. 1 shows each lot's penetrated planned stages within one day. For example, for lot_4 140 the corresponding penetrated planned stages within one day 142 are illustrated by a bar graph. Similarly, for lot_5 150 the corresponding penetrated planned stages within one day 152 are illustrated by another bar graph. By summing each lot's penetration of every defined stage, a stage's plan move (target) in one day can be acquired. FIG. 1 illustrates the Σ lot(i) at each stage showing the stage summation moves in one day 117.

From a further point of view, as a lot may be stopped during processing due to manufacturing issues or other conditions, a Q-time or Hold-Time, i.e., "Budget Time", may be checked, without reference to the Required Date, using "Budget Time"=Remaining Days−theoretical process time=(DR−X). As long as DR−X is large enough, i.e., indicates that sufficient time is available to permit the needed added Hold-Time, no adjustment is needed.

The "penetration stages per day" can also be obtained by dividing the "Remaining Stages" by the "Budget Time", i.e., P-stages/day=S$_g$/Hold-Time. For example, if a) there are 10 days before the delivery date, DR=10, b) there are still 5 stages that need to be done, S$_g$=5, and c) the theoretical process time required is 5 days, X=5, then there are (DR−X=) 5 days available for "Budget Time", and the P-stages/day is (S$_g$/Hold-Time=5/5) 1 stage/day. In other words, in this example the target will be met if 1 stage/day is passed by the lot in question. Preferably, this number is calculated once per day during processing. To be more accurate, the production shift may need to be calculated by ½ days. With the required date, REQ_DATE, being checked against every day, the target will be calculated every day.

If the "Budget Time" is too large, a maximum value should be defined as the upper limit, in the manner of the "stage estimated cycle time" (SeCT) and "stage modified cycle time" (SmCT) mentioned above. This maximum value can be defined when an order is discussed with a customer and a delivery date for the order is initially agreed upon and put on the purchase order. That delivery date is the target day, REQ_DATE, committed to for having the order completed and ready, and the maximum value is usually derived or may be defined by summing the product of the multiplication of the theoretical process time, X, for each stage by the performance factor, K, defined arbitrarily but related to the process being performed and, as noted, typically may be, for example, about 3.5 in keeping with current fabrication process capability in semiconductor wafer processing. The factor K is used since the "theoretical process time" X does not include delivery time or moving time from machine to machine, and an additional time factor for each machine is required. The factor K is selected so that K−1(X) is the "Budget Time" (Q-time or Hold-time) for each stage.

It is also important to minimize stage cycle time. For example, the "Budget Time" may be >1X and <3.5 X, or it may be <1X, and in a given situation, 1 day may not be enough to pass one stage because the process time and/or "Budget Time" is too large, so that there is a need for adjustment or correction. If the "theoretical process time"+"Budget Time" (X+Hold-Time)>24 hours, then 24 hours are used as the stage cycle time. This is the minimum and will ensure passing a minimum of 1 stage in one day.

If it is known how many stages need to be passed per day for each lot then all the lots for a particular stage can be summed up, as illustrated in FIG. 1. Then it becomes known for a certain stage how many goods to pass through on a particular day. This enables the determination of how many machines are to be allocated to that stage. Thus the system sets a target for the production people to plan moves for each stage, as described by the stage summation moves in one day 117 in FIG. 1.

The total length of time required is estimated at 3.5 X. However, for each stage, the time is not fixed to 3.5 X. It can be more or less depending on how far it is from "wafer out" and adjustment is made accordingly. Once it is determined, then it is known for each lot, how many stages it must pass. Then the numbers for each stage can be summed up to obtain the number of goods or wafers that will pass a certain stage.

Actually, in each stage, there are many machines. Out of these many machines there is one key machine. If a stage has too many goods that need to be passed, but the number of available key machines is limited (not enough), then the stage becomes a bottleneck. How to allocate equipment (equipment allocation) will be addressed in a different article. After equipment allocation, adjustment needs to be made based on priority. This is yet another topic that will be addressed separately.

The output of the system is a summary list:

|  | Move |
| --- | --- |
| Stage 1 | 1000 |
| Stage 2 | 500 |
| Stage 3 | 500 |
| . | . |
| . | . |
| . | . |
| Stage n |  |

FIG. 1 does not show the output of the system, rather it is drawn from the list above, and determines the quantity only.

It will therefore be seen that a system and method are provided for production line target generation, wherein the delivery date is established as the first target and other related processing factors are defined by backtracking the manufacturing line requirements to determine how many process stages need to be passed before delivery and to decide where to setup and arrange the production equipment that will provide the executable penetrative stages so that a number of lots of workpieces are passed through a series of fabrication stages during processing, to ultimately achieve a production goal in a timely manner.

While the present invention has been described in terms of specific embodiments and combinations, it will be appreciated that the invention is not limited to the particular examples presented herein, and that the scope of the protection is defined in the attached claims.

What is claimed is:

1. A target generation system for a production line, wherein a number of lots of workpieces are moved through a series of fabrication stages during processing, comprising:

means for setting for each lot an initial delivery date (REQ_DATE), wherein the REQ_DATE is defined by a purchase order;

means for monitoring the processing of each lot while passing through the stages, comprising:

means for calculating days remaining (DR) by subtracting a present date (TODAY) from the initial delivery date (REQ_DATE-TODAY) for each lot;

means for calculating remaining stages ($S_g$) for each lot to reach a last processing stage by subtracting a number of an instant stage from a number of the last processing stage; and means for dividing the remaining stages by the remaining days ($S_g$/DR) to derive penetration stages per day required for each lot; and means for using the derived penetration stages to target for a movement of the lots through each remaining stage to meet the REQ_DATE defined by the purchase order.

2. The system of claim 1 comprising means for summing each lot's penetration of every defined stage to acquire a stage's plan move in one day.

3. A method for production line target generation, wherein a number of lots of workpieces are moved through a series of fabrication stages during processing, comprising:

setting for each lot an initial delivery date (REQ_DATE), wherein the REQ_DATE is defined by a purchase order;

monitoring the processing of each lot while passing through the stages, comprising:

calculating days remaining (DR) by subtracting a present date (TODAY) from the initial delivery date (REQ_DATE-TODAY) for each lot;

calculating remaining stages ($S_g$) for each lot to reach a last processing stage by subtracting a number of an instant stage from a number of the last processing stage; and dividing the remaining stages by the remaining days ($S_g$/DR) to derive penetration stages per day required for each lot; and using the derived penetration stages to target for a movement of the lots through each remaining stage to meet the REQ_DATE defined by the purchase order.

4. The method of claim 3 comprising summing each lot's penetration of every defined stage to acquire a stage's plan move in one day.

* * * * *